(12) United States Patent
Seshadri et al.

(10) Patent No.: US 7,138,901 B2
(45) Date of Patent: Nov. 21, 2006

(54) TEMPERATURE MEASURING DEVICE AND SYSTEM AND METHOD INCORPORATING THE SAME

(75) Inventors: Hari Nadathur Seshadri, Karnataka (IN); Venkat Subramaniam Venkataramani, Clifton Park, NY (US); Amitabh Verma, Karnataka (IN); Geetha Karavoor, Mangalpady (IN); David Joseph Sorg, Saint Marys, PA (US)

(73) Assignee: General Electric Company, Niskayuna, NY (US)

( * ) Notice: Subject to any disclaimer, the term of this patent is extended or adjusted under 35 U.S.C. 154(b) by 127 days.

(21) Appl. No.: 10/813,101

(22) Filed: Mar. 30, 2004

(65) Prior Publication Data

US 2005/0225422 A1  Oct. 13, 2005

(51) Int. Cl.
*H01C 7/02* (2006.01)

(52) U.S. Cl. ............ 338/25; 338/22 R; 338/28; 338/34

(58) Field of Classification Search .......... 338/13, 338/20, 22 R, 22 SD, 25, 28, 34, 36; 266/280; 60/284, 286, 300; 73/23.2, 31.05; 219/202, 219/205, 519
See application file for complete search history.

(56) References Cited

U.S. PATENT DOCUMENTS

| | | | | |
|---|---|---|---|---|
| 3,811,937 A | * | 5/1974 | Mather | 361/320 |
| 3,958,209 A | | 5/1976 | Soda et al. | 338/22 |
| 4,010,118 A | | 3/1977 | Walch | 252/521 |
| 4,010,119 A | | 3/1977 | Walch | 252/521 |
| 4,010,120 A | | 3/1977 | Walch | 252/521 |
| 4,010,121 A | | 3/1977 | Walch | 252/521 |
| 4,010,122 A | | 3/1977 | Walch | 252/521 |
| 4,013,592 A | | 3/1977 | Matsuoka et al. | 252/521 |
| 4,058,787 A | * | 11/1977 | Ichikawa et al. | 338/22 R |
| 4,126,583 A | | 11/1978 | Walter | 252/521 |
| 4,208,786 A | | 6/1980 | Merchant et al. | 29/612 |
| 4,891,158 A | | 1/1990 | Hata | 252/518 |
| 5,297,438 A | * | 3/1994 | Alles et al. | 338/4 |
| 5,476,822 A | | 12/1995 | Iwaya et al. | 501/152 |
| 5,536,449 A | | 7/1996 | Feltz et al. | 252/521 |
| 5,561,411 A | | 10/1996 | Kuzuoka | 338/22 |
| 5,568,116 A | | 10/1996 | Iwaya et al. | 338/22 |
| 5,610,111 A | | 3/1997 | Iwaya et al. | 501/136 |
| 5,635,438 A | * | 6/1997 | Cowfer et al. | 502/319 |
| 5,637,543 A | | 6/1997 | Iwaya et al. | 501/152 |
| 5,681,111 A | | 10/1997 | Akbar et al. | 374/185 |
| 5,879,750 A | | 3/1999 | Kuzuoka | 427/397.7 |
| 5,955,937 A | | 9/1999 | Groen | 338/22 |
| 6,136,741 A | | 10/2000 | Nakayama et al. | 501/152 |
| 6,204,748 B1 | | 3/2001 | Sorg | 338/22 R |

FOREIGN PATENT DOCUMENTS

| | | | |
|---|---|---|---|
| DE | 4021997 A1 | * | 1/1991 |
| EP | 638910 A2 | | 2/1994 |
| EP | 799808 A1 | | 10/1997 |
| EP | 609888 B1 | | 6/1998 |
| EP | 626356 B1 | | 9/1999 |
| EP | 810611 B1 | | 10/1999 |

(Continued)

*Primary Examiner*—Tu Hoang
(74) *Attorney, Agent, or Firm*—Fletcher Yoder (57) ABSTRACT

A system having a heat source, a component coupled to the heat source, and at least one thermistor coupled to the component and adapted to monitor temperature of the component, wherein the thermistor has a core-shell microstructure having a shell disposed about a core, the core comprising $Cr_2O_3$ and the shell comprising a rare earth element compound.

20 Claims, 5 Drawing Sheets

FOREIGN PATENT DOCUMENTS

| | | |
|---|---|---|
| EP | 623569 B1 | 4/2000 |
| EP | 655752 B1 | 2/2003 |
| WO | WO 93/22255 | 11/1993 |

* cited by examiner

TEMPERATURE MEASURING DEVICE AND SYSTEM AND METHOD INCORPORATING THE SAME

BACKGROUND

This invention relates generally to temperature measuring devices or thermistors and, more particularly, to material compositions for high temperature thermistors.

High temperature thermistors are often employed to measure the temperature in a hot water supply, the temperature of a heating furnace, the exhaust gas temperature of a heating furnace, or the exhaust gas temperature of a motor vehicle. In these applications, temperatures may range from about 100 degree Celsius to around 1000 degree Celsius. However, the performance of these thermistors generally degrades at higher temperatures.

In certain applications, the accuracy of these thermistors is particularly important for the overall operation of a system. For example, the performance of engines, catalytic converters, and other devices may depend largely on the accuracy of temperature measurements. In combustion engines, the fuel-air mixture, pressure, temperature, and other factors play an important role in the control of exhaust emissions, such as nitrous oxide ($NO_x$), carbon monoxide (CO), and hydrocarbons (HCs). In addition, modern vehicles are often equipped with catalytic converters, which are disposed in an exhaust line coupled to the engine. These catalytic converters use agents or catalysts, such as reduction and oxidation catalysts, to convert emissions of environmentally unfriendly gases into more environmentally friendly gases. For example, a particular catalytic converter may convert nitrous oxide, carbon monoxide, and hydrocarbons into other forms, such as carbon dioxide and nitrogen. Again, accurate temperature measurements play an important role in the operation of these catalytic converters and the overall combustion engine.

A typical catalytic converter operates at temperatures well above 200 degrees Celsius. The performance of the catalytic converter can be monitored by the temperature differential across the converter. In certain applications, the operating temperature of a catalytic converter may be in the range of 300–600 degrees Celsius and the temperature differential across the catalytic converter may be on the order of 10 degree Celsius. Under certain conditions, the temperature endured by a catalytic converter can reach or exceed 1000 degrees Celsius, e.g., if unburned fuel is present in the exhaust line. Hence, thermistors should preferably withstand high temperatures to ensure reliable operation.

Existing thermistors include an unglazed thermistor, which has chromium (Cr) based oxides that have a negative temperature coefficient (NTC) of resistance. Unfortunately, the resistance values of these Cr-based oxides shift upon sufficient aging, e.g., at 1000 degrees Celsius for 1000 hours. This resistance shift is apparently caused by the loss of chromium oxide ($Cr_2O_3$) by volatilization over time.

There is a need, therefore, for an improved thermistor, which can reliably perform at high temperatures over time.

BRIEF DESCRIPTION

In accordance with certain embodiments of the invention, a system is provided including a heat source, a component coupled to the heat source, and at least one thermistor coupled to the component and adapted to monitor temperature of the component. The thermistor has a core-shell microstructure having a shell disposed about a core, the core comprising $Cr_2O_3$ and the shell comprising a rare earth element compound.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
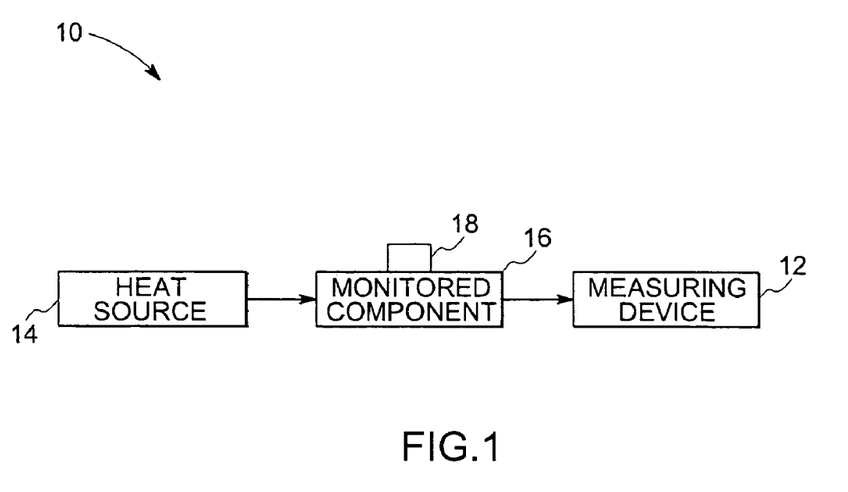
FIG. 1 is a step diagram of an exemplary temperature monitored system having a thermistor in accordance with embodiments of the present technique.

As discussed in detail below, embodiments of the present technique comprise a temperature sensor, such as a thermistor, having material characteristics that ensure reliable operation over a broad temperature range, e.g., reaching or exceeding 1000 degrees Celsius. FIG. 1 illustrates a diagrammatical representation of an exemplary temperature monitoring system 10, which includes a measuring device 12, a heat source 14, a monitor component 16, and a temperature sensor or thermistor 18. The thermistor 18 is configured for measuring the temperature of the monitor component 16 in accordance with certain embodiments of the present technique. The monitored component 16 is subject to temperature variation due to the heat source 14. For example, the monitor component 16 maybe a catalytic converter or other component of the heat source 14, which may comprise a combustion engine as indicated in FIG. 1. In operation, the measuring device 12 measures the temperature of the monitored component 16 via the thermistor 18. For example, the measuring device 12 may include software, hardware, or a variety of electrical-mechanical components of a central control system, which utilizes temperature data provided by the thermistor 18. The illustrated thermistor 18 includes a material composition adapted to ensure reliable and accurate temperature measurements over a broad temperature range up to relatively high temperatures, e.g., 1000 degrees and higher. Certain embodiments of the thermistor 18 have a core-shell microstructure, which significantly improves reliability of the thermistor 18 at higher temperatures.

Figure 2:
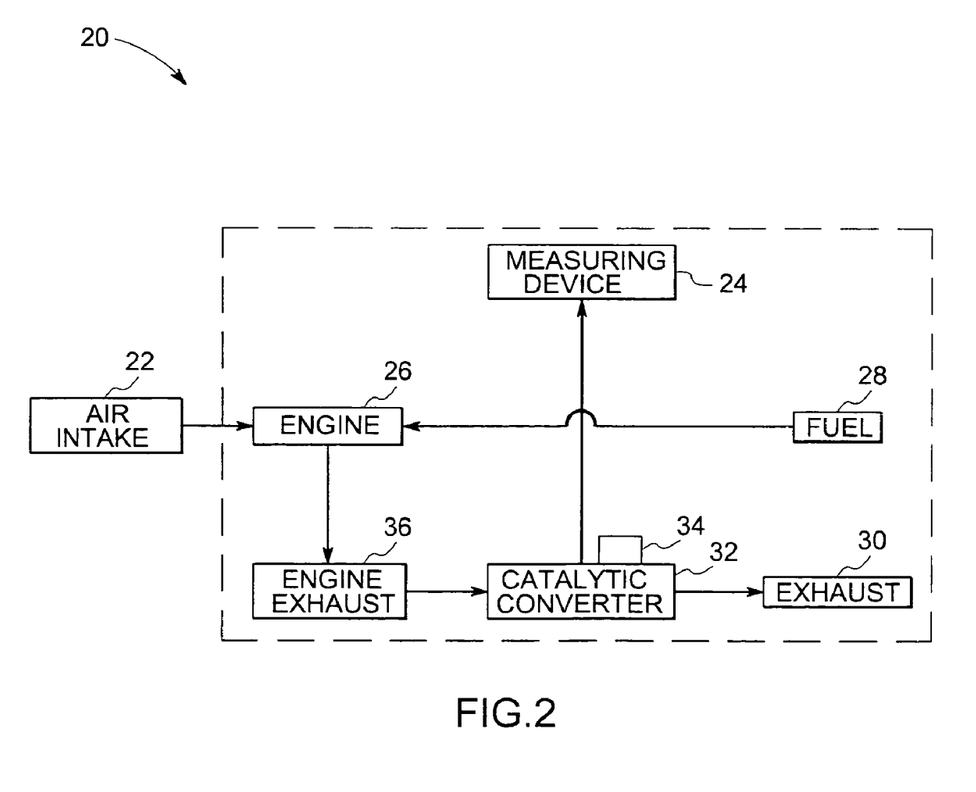
FIG. 2 is a step diagram of an exemplary temperature monitored system having an engine, catalytic converter, and thermistor in accordance with embodiments of the present technique.

FIG. 2 represents a step diagram of an exemplary temperature monitoring system 20 in accordance with certain embodiments of the present technique. Accurate temperature detection is important for operation of systems having an engine, such as automotive engines. Accordingly, an accurate temperature sensor or thermistor can improve the overall operation and efficiency of a combustion process and emissions control. The illustrated system 20 includes an air intake 22, a measuring device 24, and engine 26 receiving the air intake 22, a fuel source 28 coupled to the engine 26, and an exhaust 36 extending from the engine 26. Along the exhaust 36, the system 20 includes a catalytic converter of 32 and a temperature sensor or thermistor 34, which is coupled to the measuring device 24 for monitoring the temperature of engine exhaust 36 exiting the engine 26. In operation, the air intake 22 provides air from the atmosphere into the engine 26, while the fuel source 28 supplies a fuel, such as gasoline, to provide a suitable fuel-air ratio for combustion within the engine 26. After the fuel-air mixture burns within the engine 26, the engine exhaust 36 exits the engine 26 through the exhaust line 30. As recognized by one of ordinary skill in the art, the engine exhaust 36 includes various environmentally unfriendly gases, such as nitrous oxide, carbon monoxide, and hydrocarbons. Accordingly, the catalytic converter 32 functions to convert these gases into more environmentally friendly gases, such as carbon dioxide and nitrogen. In turn, these environmentally friendly gases are discharged into the atmosphere through the exhaust 36.

As illustrated in FIG. 2, the thermistor or pair of thermistors 34 facilitates temperature sensing and monitoring via the measuring device 24, such that the system 20 has temperature data corresponding to performance of the catalytic converter 32. In certain embodiments, the thermistor or pair of thermistors 34 and measuring device 24 detects a temperature differential across the catalytic converter 32, e.g., a temperature differential between an inlet and outlet of the catalytic converter 32. Depending on the particular application, the catalytic converter 32 may operate in the range of about 100 to 1000 degrees Celsius, or in a narrower range of about 300–600 degrees Celsius. The temperature differential across the catalytic converter 32 may be up to 5, 10, 15, 20, or 25 degrees Celsius in certain embodiments of the system 20. Given that combustion and emission controls are largely dependent on accurate temperature measurements, the illustrated thermistor or pair of thermistors 34 includes a material composition adapted to ensure reliable and accurate temperature measurements over a broad temperature range up to relatively high temperatures, e.g., 1000 degrees and higher. Embodiments of the thermistor 34 may include a core-shell microstructure, which significantly improves reliability of the thermistor or pair of thermistors 34 at higher temperatures.

Figure 3:
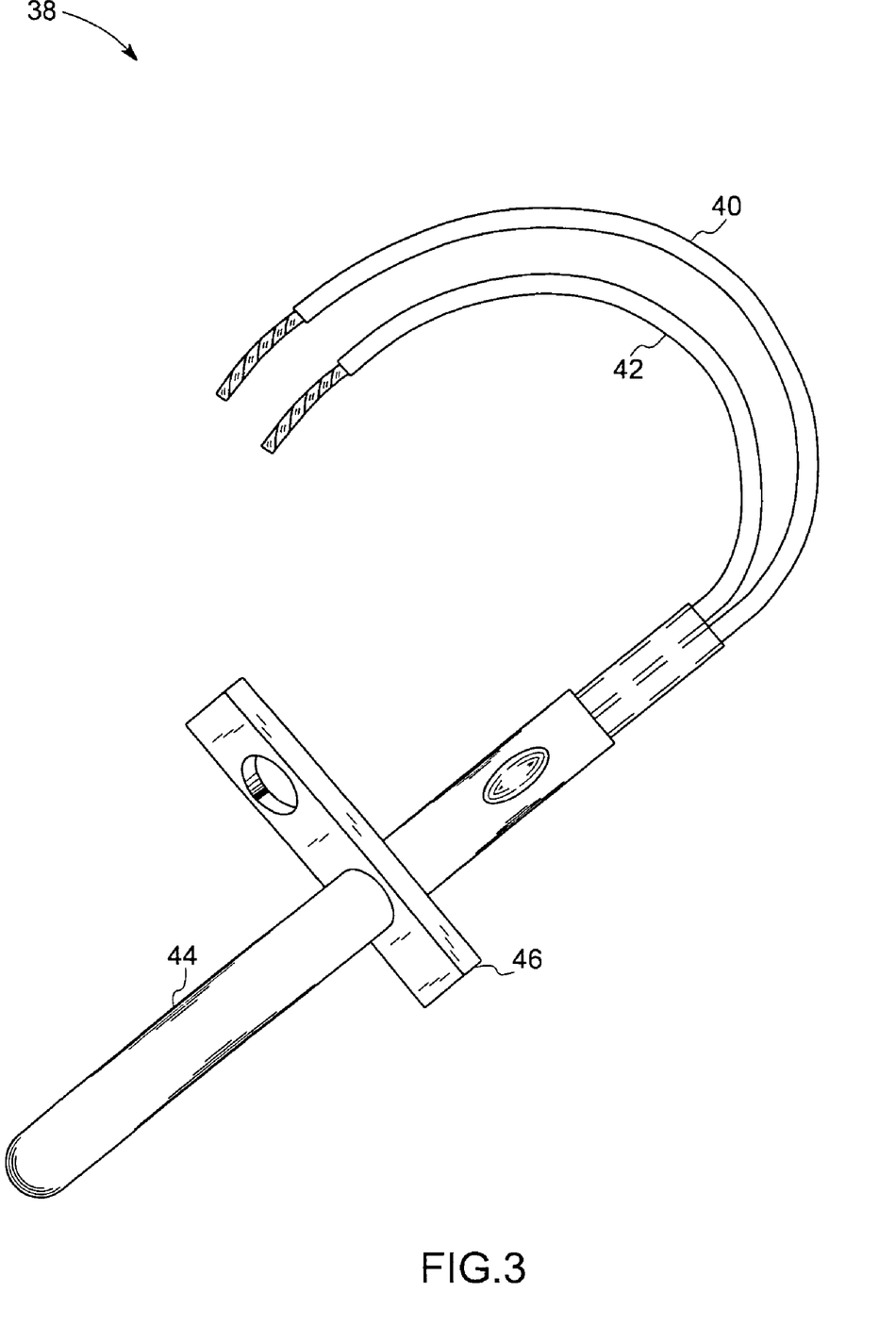
FIG. 3 is a perspective view of a thermistor assembly in accordance with embodiments of the present technique.

FIG. 3 illustrates a perspective view of an exemplary thermistor assembly 38 in accordance with embodiments of the present technique. The thermistor assembly 38 includes a pair of lead elements 40 and 42, which may extend to a desired measuring device or monitoring system, e.g., measuring devices 12 and 24 of respectively FIGS. 1 and 2. The illustrated thermistor body 46 also includes a thermistor probe or element 44, which extends from a fastening mechanism or mount member 46. Accordingly, the thermistor assembly 38 may be mounted to a desired component, such that the thermistor probe or element 44 extends into the desired component and the mount member 46 is externally fastened. For example, the thermistor assembly 38 may be mounted to the monitored component 16 of FIG. 1 or the catalytic converter 32 of FIG. 2.

The thermistors 18, 34, and 38 of FIGS. 1–3 may include a variety of material compositions having a core-shell microstructure to improve the resistance variability and aging characteristics at higher operating temperatures, e.g., up to or exceeding 1000 degrees Celsius. The aging characteristic can be defined as the variation of resistance with change in temperature over time. In certain embodiments, the thermistors 18, 34, and 38 comprise a core-shell microstructure having a chromia-based core and a shell disposed about the core, such that the shell reduces or substantially arrests chromia loss due to chromia volatilization at higher temperatures, e.g., exceeding 600 degrees Celsius. For example, certain embodiments of the thermistors 18, 34, and 38 have a core comprising $Cr_2O_3$ and a shell comprising a rare earth element compound, such as Pr, Nd, Sm, Eu, Gd, Th, Dy, Er, Yb, Ce or Y. In some embodiments, the shell includes but not limited to $M_2O_3$, MCrO3, M-nitrate, M-carbonate, M-hydroxide, alkooxides, carboxylates, or a mixture of $M_2O_3$ and $Cr_2O_3$. In addition, various embodiments of the shell may comprise an aliovalent dopant, such as Ca, Ba, Sr, Mg, Si or Ti. In a further embodiment the shell may comprise Y and alkaline earth elements. The shell would eventually be a compound of the added element and chromia. As discussed in detail below, the core-shell microstructure of the thermistors 18, 34, and 38 may be formed by a variety of techniques.

For example, a shell comprising $MCrO_3$ or $MCrO_3$ plus $Cr_2O_3$ may be formed by direct coating (e.g., slurry coating) of $MCrO_3$ particles or $MCrO_3$ plus $Cr_2O_3$ mixture onto a core comprising $Cr_2O_3$. Alternatively, a shell comprising $MCrO_3$ or $MCrO_3$ plus $Cr_2O_3$ may be formed by coating oxide, nitrate, carbonate, or hydroxide of a rare earth metal or of a rare earth metal plus chromium onto the core comprising $Cr_2O_3$ particles. Here, this can be achieved by direct coating or chemical precipitation of these particles onto previously dispersed $Cr_2O_3$ particles. For example, the $Cr_2O_3$ particles may be dispersed in a solution comprising a rare earth metal or a rare earth metal plus chromium. Then, a nitrate, carbonate, or a hydroxide of a rare earth metal may be precipitated as a shell onto the $Cr_2O_3$ particles, which form the core; Additionally, hydroxides of a rare earth metal and chromium can be co-precipitated as the shell. Moreover, aliovalent dopants, such as Ca, Ba, Sr, Mg, Si or Ti, can be incorporated into the rare earth metal sites to tailor the resistance-temperature characteristics of the core-shell microstructure of thermistors 18, 34, and 38. In certain embodiments, this can be achieved by mixing in the dopant containing solution with the rare earth metal containing solution followed by the co-precipitation as shell onto the $Cr_2O_3$ particles. Finally, the precipitated powder is heat treated to form the core-shell microstructure having a $Cr_2O_3$ core and a $MCrO_3$ or a $MCrO_3$ plus $Cr_2O_3$ shell.

Figure 4:
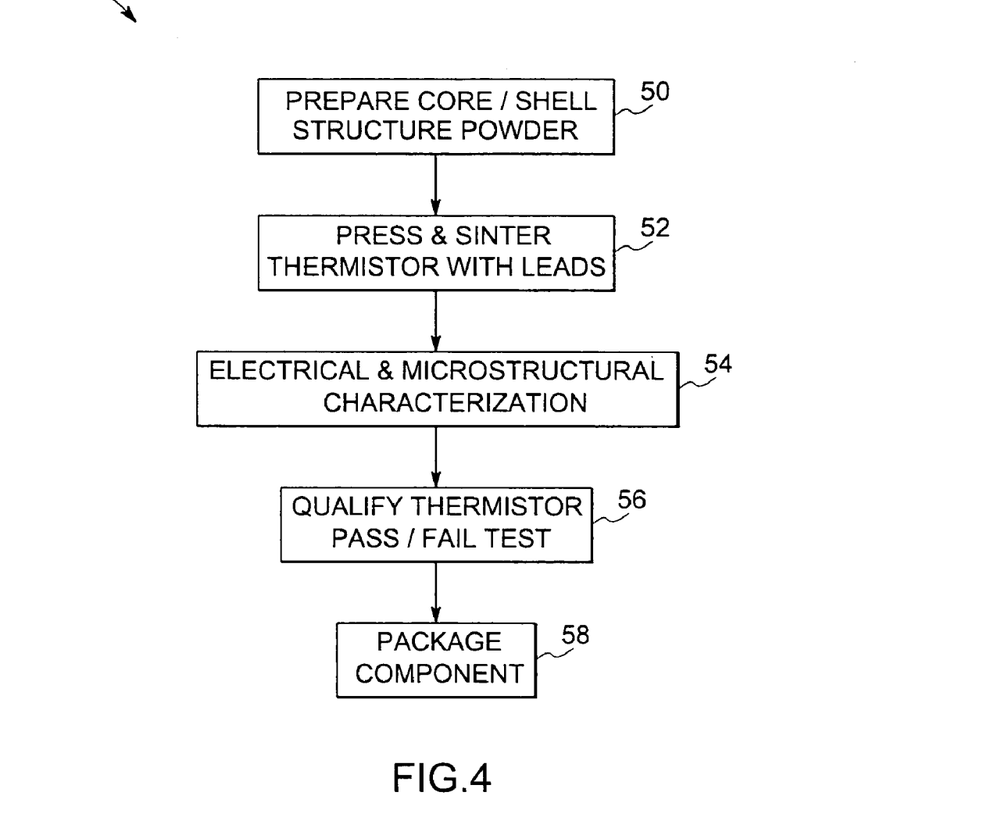
FIG. 4 is a flow chart illustrating exemplary steps in preparation of the thermistor in accordance with embodiment of the present technique.

FIG. 4 is a flowchart illustrating a process 48 for preparation of a core-shell microstructure in accordance with embodiments of the present technique. As illustrated, the process 48 begins at step 50 by preparing a core/shell structure powder(s), such as the core-shell microstructure materials described in detail above. The process 48 then proceeds to press and sinter a thermistor, e.g., thermistors 18, 34, and 38, with leads at step 52. At step 54, the process 48 performs electrical and microstructural characterization of the thermistor having the core-shell microstructure. The electrical characterization includes measurement of electrical resistivity from room temperature to 1000 degrees Celsius. The microstructural characterization includes Scanning Electron Microscopy and Energy Dispersive X-ray Analysis, wherein the micro structural characterization may be visual observation and dimensional measurement to insure the part was adequately sintered and has no cracks. The electrical characterization may consist of measuring the electrical resistance at one or several temperatures. At step 56, the process 48 analyzes operation of the thermistor to qualify the thermistor based on a pass/fail test(s) comprising measurement of room temperature electrical resistance. Finally, the process 48 proceeds to package the component at step 58.

Figure 5:
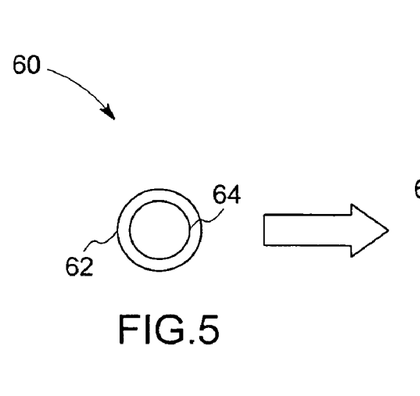
FIG. 5 is a diagram illustrating a basic building step of a core and shell structure of the thermistor in accordance with embodiment of the present technique.

FIG. 5 is a diagram illustrating a basic building block 60 of a core-shell microstructure in accordance with certain embodiments of the present technique. As discussed above, a shell and a core of the building block 60 may comprise a variety of materials. For example, the illustrated building block 60 may have the core 64 comprising $Cr_2O_3$ and the shell 62 includes $YCrO_3$. In other embodiments, the shell 62 may include a rare earth element compound, such as Pr, Nd, Sm, Eu, Gd, Tb, Dy, Er, Yb, Ce or Y. In some embodiments, the shell 62 includes but not limited to $M_2O_3$, $MCrO_3$, M-nitrate, M Carbonate, M-hydroxide, alkooxides, carboxylates, or a mixture of $M_2O_3$ and $Cr_2O_3$. In addition, various embodiments of the shell 62 may include an aliovalent dopant, such as Ca, Ba, Sr, Mg, Si or Ti.

Figure 6:
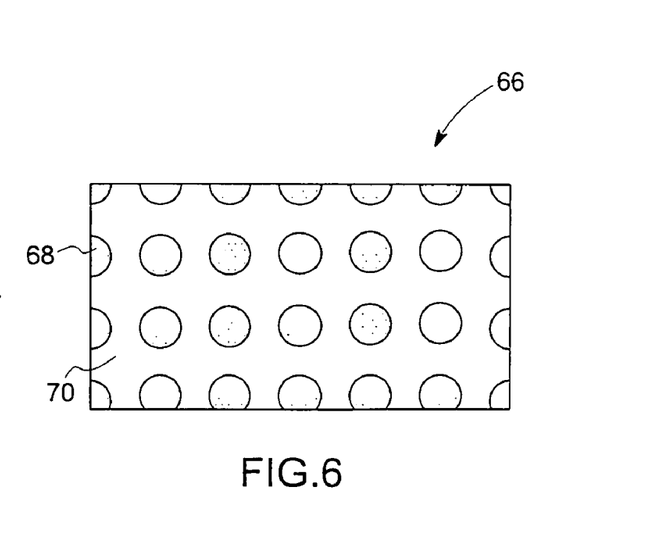
FIG. 6 is a diagram illustrating a core and a shell microstructure of the thermistor having a $Cr_2O_3$ core and a $YCrO_3$ shell in accordance with embodiment of the present technique.

FIG. 6 is a diagram illustrating a core-shell microstructure 66 having a core or core material 68 surrounded by a shell or shell material 70 in accordance with embodiments of the present technique. Again, the shell 70 and the core 68 of the core-shell microstructure 66 may comprise a variety of material compositions. For example, the illustrated core-shell microstructure 66 may have the core 68 comprising $Cr_2O_3$ and the shell 70 comprising $YCrO_3$. In other embodiments, the shell 70 may include a rare earth element compound, such as Pr, Nd, Sm, Eu, Gd, Tb, Dy, Er, Yb, Ce or Y. In some embodiments, the shell 70 includes but not limited to $M_2O_3$, $MCrO_3$, M-nitrate, M carbonate, M-hydroxide, alkooxides, carboxylates, or a mixture of $M_2O_3$ and $Cr_2O_3$. In addition, various embodiments of the shell 70 may include an aliovalent dopant, such as Ca, Ba, Sr, Mg, Si or Ti.

Figure 7:
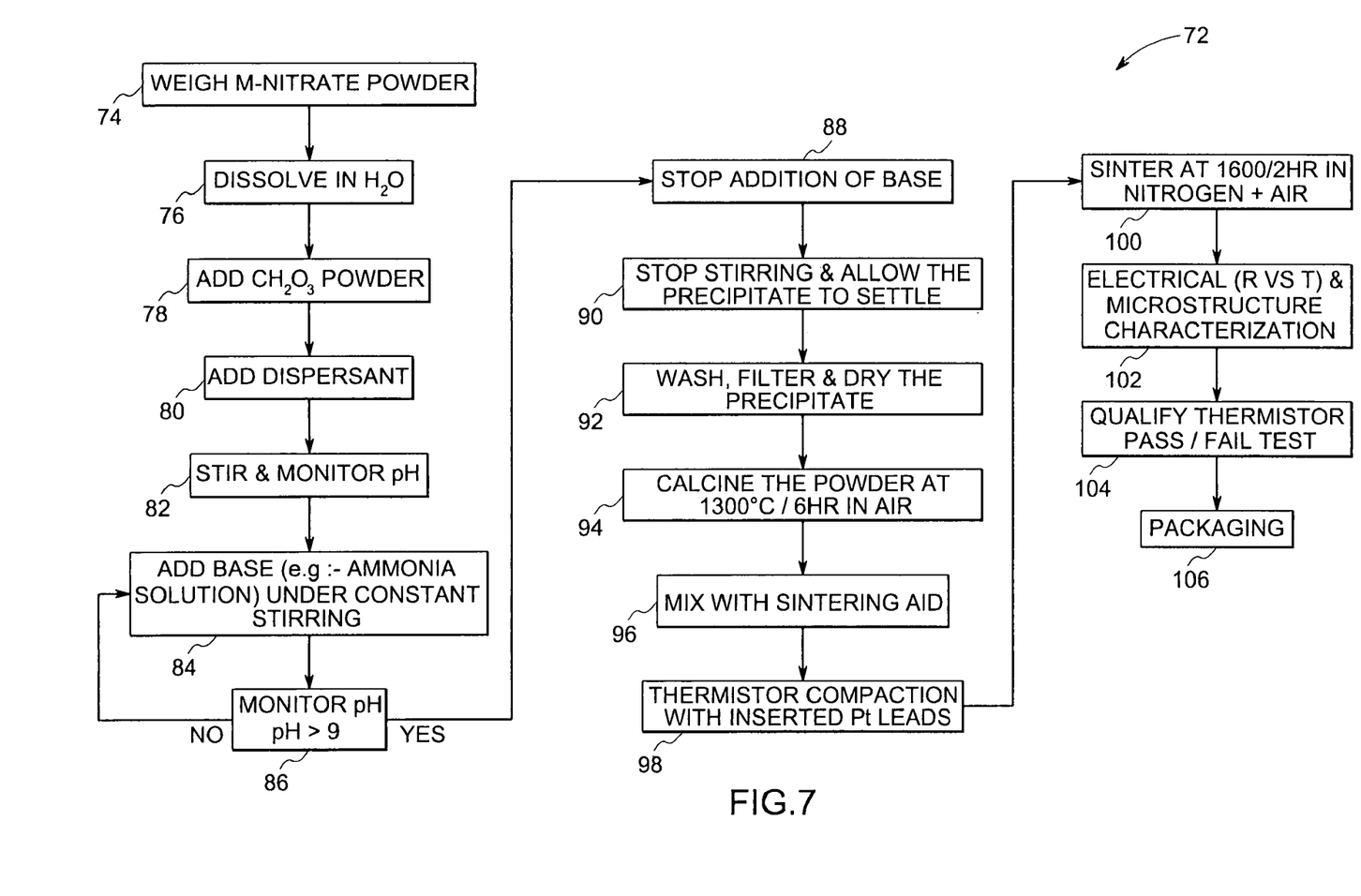
FIG. 7 is a flow chart illustrating an exemplary method for preparation of a core and shell microstructure in accordance with embodiment of the present technique.

The core-shell microstructure may be obtained by a variety of techniques, such as the exemplary processes described in detail below with reference to FIGS. 7 and 8. Turning first to FIG. 7, a flowchart illustrates an exemplary process 72 for forming a thermistor having a core-shell microstructure in accordance with embodiments of the present technique. According to the techniques of process 72, the core-shell microstructure may be formed from a shell material comprising particles of $MCrO_3$ or a mixture of $MCrO_3$ and $Cr_2O_3$, which is coated onto a core material comprising $Cr_2O_3$ particles.

As illustrated in FIG. 7, the process 72 begins at step 74 by weighing a desired amount of M-nitrate powder, where M represents a rare earth metal step. The process 72 then proceeds to dissolve the M-nitrate powder into water to form a solution at step 76. In other embodiments as mentioned above, the powder may be dissolved in some suitable solvent instead of water. At step 78, a desired amount of $Cr_2O_3$ powder is added to this solution. At step 80, the process 72 proceeds to add a dispersant to the mixture containing M-nitrate solution and $Cr_2O_3$ powder. Accordingly, the mixture at step 80 may include M-nitrate solution, $Cr_2O_3$ and dispersant. The process 72 then proceeds to monitor the pH levels of the solution while the solution is mixed or stirred by manual or automatic means at step 82. The process 72 then proceeds to add a base, such as an ammonia solution, to the mixture at step 82 and the mixing continues in step 84. At query step 86, the process 72 evaluate whether the pH levels are greater than about 9. If not, then the process 72 continues adding a base to the mixture at step 84. If the pH levels of the mixture are greater than about 9, then the process 72 ceases adding the base to the mixture at step 88. At this point, the mixture may include powders of $Cr_2O_3$ core surrounded by a shell of M-hydroxide.

At step 90, the process 72 stops mixing or stirring the mixture to allow a precipitate to settle. For example, the settled precipitate may include powders of $Cr_2O_3$ core surrounded by a shell of M-hydroxide. The process 72 then proceeds to wash, filter, and dry the precipitate (step 92). At step 94, the process 72 calcines the precipitate or powder at a suitable temperature for a desired duration, e.g., approximately 1300 degrees Celsius for about 6 hours in air. In other embodiments, the calcinations step 94 may include conditions, such as 1000 to 1300 degrees Celsius for about 1 to 6 hours in air. At this point, the material may include powders of $Cr_2O_3$ core and $MCrO_3$ shell. Alternatively, the process 72 may include coating $MCrO_3$ slurry on to $Cr_2O_3$ powder to form the core-shell structure. The process 72 then proceeds to mix the calcined powder with sintering aid at step 96. At this point, the material may include but not limited to $MCrO_3$, $Cr_2O_3$, CaO, $SiO_2$ and $TiO_2$.

At step 98, the process 72 proceeds to form a thermistor by molding in a press, which presses ceramic powder around a set of leads. The process 72 then proceeds to sinter the thermistor 98 at suitable conditions for a desired duration, e.g., approximately 1600 degrees Celsius for about 1 hour in nitrogen followed by 1 hour in air at step 100.

At step 102, the process 72 proceeds to characterize the electrical and micro structural characteristics of the compacted and sintered thermistor. For example, the electrical characterization includes resistance versus temperature characteristics of the thermistor. The micro structural characterization includes Scanning Electron Microscopy and Energy Dispersive X-ray Analysis, wherein the micro structural characterization may be visual observation and dimensional measurement to insure the part was adequately sintered and has no cracks. The electrical characterization may consist of measuring the electrical resistance at one or several temperatures. At step 104, the process 72 proceeds to qualify the thermistor via a variety of pass/fail tests. For example, the qualification step 104 may include measurement of electrical resistivity at room temperature. Finally, the process 72 proceeds with packaging of the thermistor at step 106. For example, the packaging step 106 may include counting the parts by weight, cataloging the number, glass encapsulation of thermistor and finally putting them in storage in a polyethylene bag.

Figure 8:
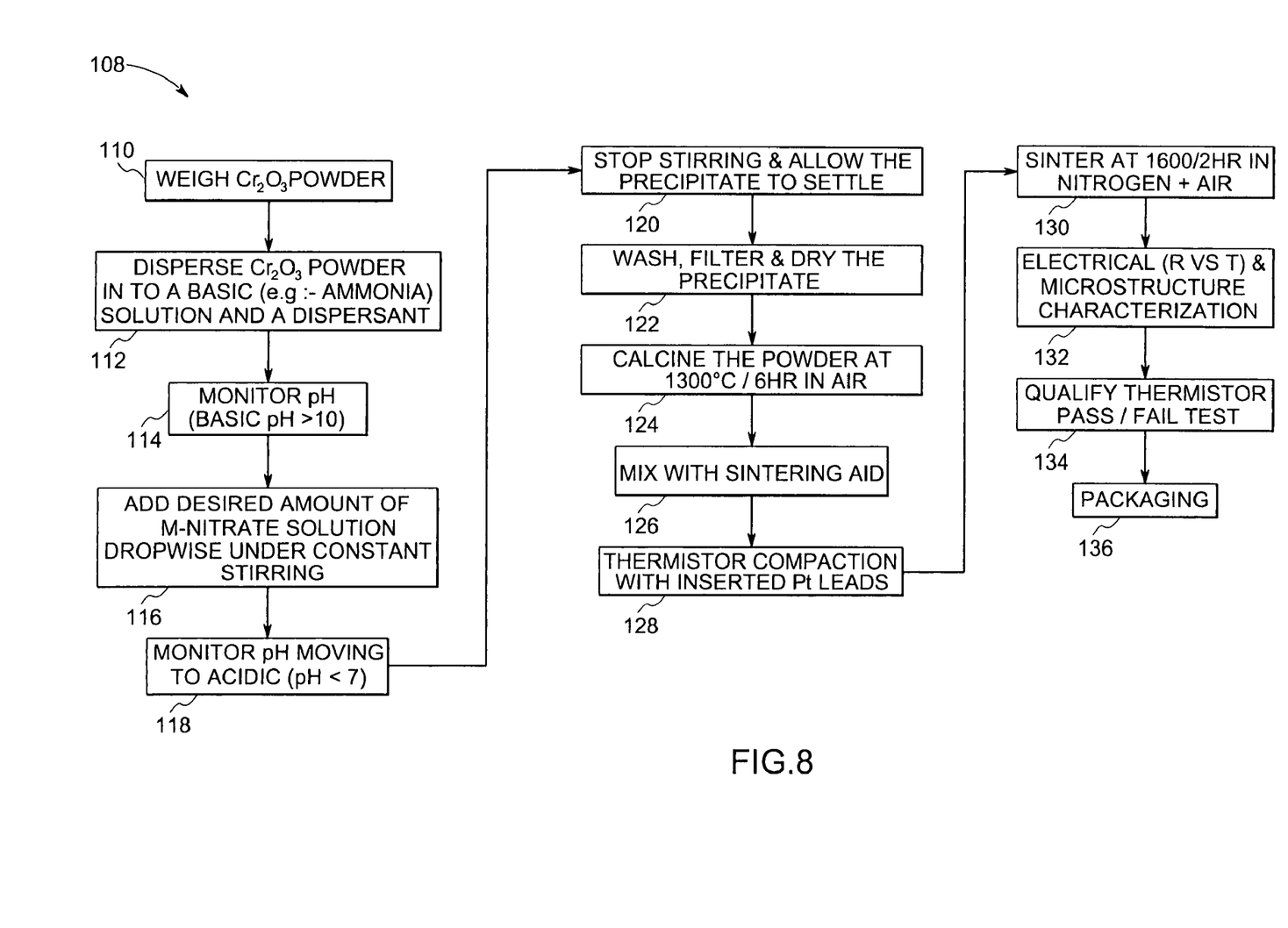
FIG. 8 is a flow chart illustrating an alternative method for preparation of a core and shell microstructure in accordance with embodiment of the present technique.

Turning now to FIG. 8, a flowchart illustrates an exemplary process 108 for forming a thermistor having a core-shell microstructure in accordance with embodiments of the present technique. According to the techniques of process 108, the core-shell microstructure may be formed from a shell material comprising oxide, nitrate, carbonate, or hydroxide of a rare earth metal or a rare metal plus chromium, which is coated or chemically precipitated onto a core material comprising $Cr_2O_3$ particles. At step 110, the process 100 proceeds to weigh a desired amount of $Cr_2O_3$ material, e.g., powder, which serves as material for the core of the core-shell microstructure. At step 112, the process 108 proceeds to disperse the weighed/measured $Cr_2O_3$ into a basic (e.g., ammonia) solution with a dispersant. Thus, the mixture may include ammonia solution plus $Cr_2O_3$. As the $Cr_2O_3$ powder is added at step 112, the process 108 monitors the pH levels of the solution 112 to ensure the pH levels greater than 10. The process 108 then proceeds to add a desire d amount of M-nitrate solution dropwise into the mixture while the mixture is stirred at step 116. As the M-nitrate solution is added to the mixture at step 116, the process 108 monitors the pH levels of the mixture as it becomes more acidic, e.g., approaching a pH level of approximately 7 at step 118.

Upon reaching the desired pH level, the process 108 ceases mixing/stirring to facilitate settlement of a precipitate at step 120. For example, M-nitrate, M-carbonate, or M-hydroxide may be precipitated as shell onto the $Cr_2O_3$ particles. Alternatively, hydroxides of a rare metal and Chromium can be co-precipitated as the shell obtained in step 120. Also, aliovalent dopants, such as Ca, Ba, Sr, Mg, Si or Ti, can be incorporated into the rare earth element compound sites to provide the desired resistance-temperature characteristics. This can be achieved by mixing the dopant containing solution with the earth metal containing solution followed by the co-precipitation as shell onto the $Cr_2O_3$ particles. The process 108 then proceeds to wash, filter, and dry the precipitate at step 122. At step 124, the process 108 calcines the precipitate or powder at a suitable temperature for a desired duration, e.g., approximately 1300 degrees Celsius for about 6 hours in air. In other embodiments, the calcinations step 124 may include conditions, such as differing times, calcining atmospheres, and temperatures, such as 1000 to 1300 degrees Celsius for about 1 to 6 hours in air. At this point, the material may include a core-shell microstructure comprising a $Cr_2O_3$ core and a $MCrO_3$ or a $MCrO_3$ plus $Cr_2O_3$ shell. The process 108 then proceeds to mix the calcined powder with sintering aid at step 126. At this point, the material may include but not limited to_$MCrO_3$, $Cr_2O_3$, CaO, $SiO_2$ and $TiO_2$.

At step 128, the process 108 proceeds to form a thermistor by molding in a press, which presses ceramic powder around a set of leads. The process 108 then proceeds to sinter the thermistor 128 at suitable conditions for a desired duration, e.g., approximately 1600 degrees Celsius for about 1 hour in nitrogen followed by 1 hour in air at step 130.

At step 132, the process 108 proceeds to characterize the electrical and micro structural characteristics of the compacted and sintered thermistor. For example, the electrical characterization includes resistance versus temperature characteristics of the thermistor. The micro structural characterization includes_Scanning Electron Microscopy and Energy Dispersive X-ray Analysis wherein the micro structural characterization may be visual observation and dimensional measurement to insure the part was adequately sintered and has no cracks. The electrical characterization may consist of measuring the electrical resistance at one or several temperatures. At step 134, the process 108 proceeds to qualify the thermistor via a variety of pass/fail tests. For example, the qualification step 134 may include measurement of electrical resistivity at room temperature. Finally, the process 108 proceeds with packaging of the thermistor at step 136. For example, the packaging step 106 may include counting the parts by weight, cataloging the number, glass encapsulation of thermistor and finally putting them in storage in a polyethylene bag.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A temperature measuring system, comprising:
   a heat source;
   a component coupled to the heat source; and
   at least one thermistor coupled to the component and adapted to monitor temperature of the component, wherein the thermistor comprises a body formed of a core-shell micro-structure of particles, each particle has a chromia-based core coated with a shell to reduce chromia loss due to chromia volatilization at high temperatures, and the shell comprises a rare earth element compound.

2. The system according to claim 1, wherein the heat source is an engine.

3. The system according to claim 1, wherein the component is a catalytic converter.

4. The system according to claim 1, comprising a measuring device coupled to the thermistor.

5. The system according to claim 1, comprising a motorized vehicle.

6. The system according to claim 1, wherein the rare earth element compound is selected from a group consisting of Pr, Nd, Sm, Eu, Gd, Tb, Dy, Er, Yb, Ce, and Y.

7. The system according to claim 1, wherein the shell is substantially stable at a temperature up to about 1000 degrees Celsius.

8. The system according to claim 1, wherein the rare earth element compound comprises $M_2O_3$, $MCrO_3$, M-nitrate, M-carbonate, M-hydroxide, alkooxides, carboxylates, or a mixture of $M_2O_3$ and $Cr_2O_3$, wherein M comprises a rare earth element.

9. The system according to claim 8, wherein the rare earth element compound comprises an aliovalent dopant comprising Ca, Ba, Sr, Mg, Si, or Ti.

10. A thermistor, comprising:
    a plurality of electrical contacts; and
    a thermistor body coupled to the plurality of electrical contacts, wherein the thermistor body comprises a body formed of a core-shell microstructure of particles, each particle has a chromia-based core coated with a shell to reduce chromia loss due to chromia volatilization at high temperatures, and the shell comprises a rare earth element.

11. The thermistor according to claim 10, wherein the shell is adapted to stabilize the core up to temperature of about 1000 degrees Celsius.

12. The thermistor according to claim 10, wherein the shell comprises MCrO3, and M comprises the rare earth element.

13. The thermistor according to claim 12, where M comprises Pr, Nd, Sm, Eu, Gd, Tb, Dy, Er, Yb, Ce, or Y.

14. The thermistor according to claim 10, wherein the shell comprises $M_2O_3$, and M comprises the rare earth element.

15. The thermistor according to claim 10, wherein the shell comprises $MCrO_3$, and M comprises Y.

16. The thermistor according to claim 10, wherein the shell comprises at least one compound comprising $M_2O_3$, $MCrO_3$, M-nitrate, M-carbonate, M-hydroxide, alkooxides, carboxylates, or a mixture of $M_2O_3$ and $Cr_2O_3$, wherein M comprises the rare earth element.

17. The thermistor according to claim 10, wherein the shell comprises at least one aliovalent doped compound comprising $M_2O_3$, $MCrO_3$, M-nitrate, M-carbonate, M-hydroxide, alkooxides, carboxylates, or a mixture of $M_2O_3$ and $Cr_2O_3$, wherein M comprises the rare earth element.

18. The thermistor according to claim 10, wherein the shell comprises at least one aliovalent dopant comprising Ca, Ba, Sr, Mg, Si, or Ti.

19. The thermistor according to claim 10, wherein the temperature measuring stability of the thermistor ranges up to about 1000 degrees Celsius.

20. The thermistor according to claim 10, wherein the thermistor has a temperature measuring variability of less than plus or minus 5 degrees Celsius after about 1000 hours at about 1000 degrees Celsius.

* * * * *